United States Patent [19]

Hooper

[11] Patent Number: 4,749,475
[45] Date of Patent: Jun. 7, 1988

[54] TWO STAGE ROTARY PULP SCREENING DEVICE

[75] Inventor: Anthony W. Hooper, Beaconsfield, Canada

[73] Assignee: Uniweld, Inc., Sherbrooke, Canada

[21] Appl. No.: 922,325

[22] Filed: Oct. 23, 1986

[51] Int. Cl.⁴ .......................... B01D 29/42; B07B 1/20
[52] U.S. Cl. .................................. 209/273; 209/306; 210/405; 210/413
[58] Field of Search ...................... 209/270, 273, 306; 210/405, 413, 415

[56] References Cited

U.S. PATENT DOCUMENTS

| | | | |
|---|---|---|---|
| 591,645 | 10/1897 | Baker et al. | 209/273 |
| 868,341 | 10/1907 | Holden | 209/306 |
| 1,134,304 | 4/1915 | Westbye | 209/306 X |
| 1,537,691 | 5/1925 | Priem | 209/273 |
| 3,394,809 | 7/1968 | Hunter | 209/273 |
| 3,399,772 | 10/1968 | Salomon | 209/273 |
| 3,545,621 | 12/1970 | Lamort | 210/298 |
| 3,713,536 | 1/1973 | Hooper | 209/273 |
| 4,268,381 | 5/1981 | Hooper | 209/273 |
| 4,642,189 | 2/1987 | Hooper | 210/405 |

Primary Examiner—Sherman D. Basinger
Attorney, Agent, or Firm—Larson and Taylor

[57] ABSTRACT

A two stage rotary pulp screening device has two screens in line within a single chamber. The accepts from the second screen can be recirculated to the primary screen as an integral part of the device. The improvement comprises a second screen within the chamber, downstream and co-axial with the primary screen and having a diameter at least as large as the primary screen, the impeller extends axially in a downstream direction within the second screen and has a body shape with a circular axial cross section whose diameter increases from the outlet end of the primary screen in the downstream direction, second impeller blades radiating from a downstream portion of the impeller for the length of the second screen, and second pulp stock discharge outlet from exterior of the second screen.

5 Claims, 2 Drawing Sheets

TWO STAGE ROTARY PULP SCREENING DEVICE

The present invention relates to rotary screening of pulp stock and, more particularly, to a pressure type rotary pulp screening device having two screens in line within a single chamber.

In the screening of wood pulp stock, it is generally necessary to have two stages of screening. The rejects from the primary screening stage are passed to a secondary screen which generally has larger screen openings. At least some of the accepts from the second screening stage are recirculated to the primary stage.

As disclosed in U.S. Pat. Nos. 3,713,536 and 4,268,381, it is preferred to have the flow of pulp stock through a screening device to follow an approximate parabolic curve and hence have a streamline flow. To these ends, the main shape of the impeller is arranged so that the distance between the screen and the impeller face at the inlet end of the impeller is considerably more than the distance between the screen and the impeller face at the outlet end of the impeller. The aim of both these prior art designs is to provide a streamline flow of pulp stock through the screening device and also to ensure that the full length of the screen is used. Furthermore, in U.S. pending applications, Ser. No. 703,451, , now U.S. Pat. No. 4,642,189 and Ser. No. 839,829, incorporated herein by reference, a frusto-conical shaped baffle is positioned in the space at the input end of the screen between the screen and the impeller face. The baffle divides the flow of pulp stock entering the screening device and directs the divided flow to different positions along the length of the screen. This system utilizes the full length of the screen and produces a substantially constant axial velocity of the pulp stock along the screen as the accept portion of the pulp stock passes through the screen. The increased efficiency allows increased flow rates through the screen.

It is an aim of the present invention to provide an efficient pressure screen either horizontal or vertical which has a second stage built into the same machine, thus avoiding the necessity of having to pass the pulp stock to a second screening device. The secondary screen is placed after the primary stage screen and has a diameter which is either the same or larger than the primary screen. The screen openings in the second screen are larger than those in the primary screen so the reject portion of pulp stock from the primary stage is rescreened in the secondary stage. The accepts from the secondary stage are preferably recirculated to the inlet of the primary stage as an integral part of the device and this avoids the necessity of having a reject rate control from the primary stage, and a separate secondary screen with the appropriate piping.

The present invention provides in a rotary pulp screening device of the pressure type, including a cylindrical housing having a screening chamber therein, a primary cylindrical screen within the chamber having an inlet end and an outlet end, rotary impeller mounted for rotation about a central axis within the screening chamber, the impeller having a body shape with a circular axial cross section whose diameter increases from the inlet end to the outlet end, thus having a larger annular space between the primary screen and the impeller at the inlet end than the outlet end, at least one substantially frusto-conical shaped baffle being disposed in the annular space at the inlet end, the baffle dividing flow of pulp stock entering the inlet end and directing the pulp stock at different axial locations along the length of the primary screen, means for rotating the impeller, primary impeller blades radiating from at least a portion of the impeller and extending to within a short distance from the primary screen, for substantially the length of the primary screen, and, primary pulp stock discharge outlet from exterior of the primary screen, the improvement comprising, a second cylindrical screen within the chamber, the second screen being co-axial and downstream of the primary screen, and having a diameter at least as large as the primary screen, the second screen having screen openings at least as large as the screen openings in the primary screen, the impeller extending axially in a downstream direction within the second screen, having a body shape with a circular axial cross section whose diameter increases from the outlet end of the primary screen in the downstream direction, second impeller blades radiating from a downstream portion of the impeller for substantially the length of the second screen, to within a short distance from the second screen, and second pulp stock discharge outlet from exterior of the second screen.

In other embodiments at least a portion of the flow of pulp stock from the second pulp discharge outlet is recirculated, preferably in a duct integral with the cylindrical housing, to the primary cylindrical screen. The pressure of the pulp stock from the second pulp discharge outlet is higher than the pressure of the pulp stock entering the primary screen. Valve means may be included in the recirculating duct to control the portion of the flow of pulp stock recirculating. In order to obtain increased pressure in the second pulp discharge outlet, it is preferred that the second screen has a larger diameter than the primary screen and also the second impeller blades have a larger diameter than the primary impeller blades. The screen openings in the second screen are preferably larger than those in the primary screen and in a preferred embodiment, the axial length of the second screen is in the range of about 20 to 25% of the axial length of the primary screen. The dilution water systems are preferably independent for the two screens.

In drawings which illustrate embodiments of the invention:

Figure 1:
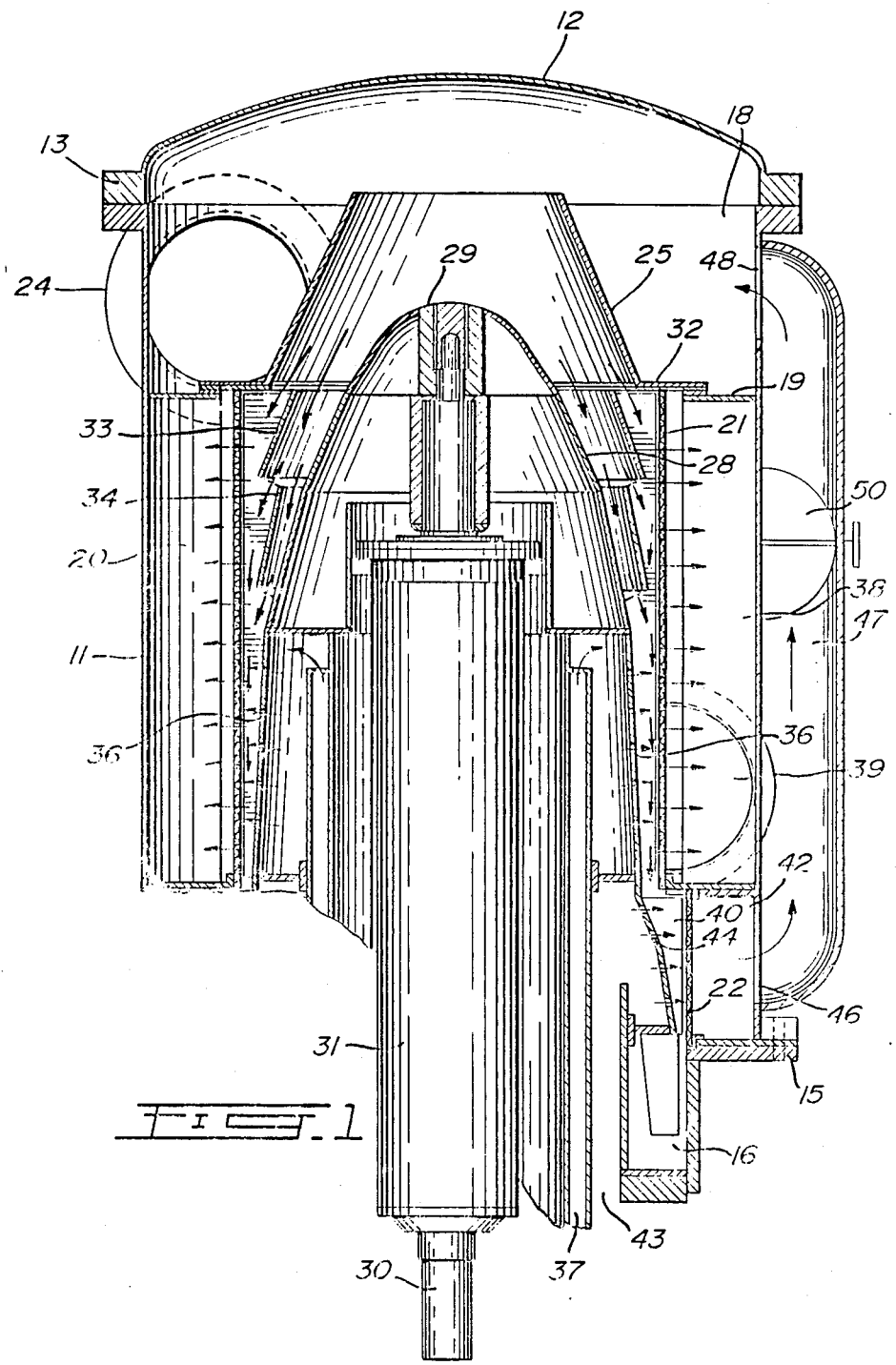
FIG 1 is a vertical section showing one embodiment of a rotary pulp screening device of the present invention.
Figure 2:
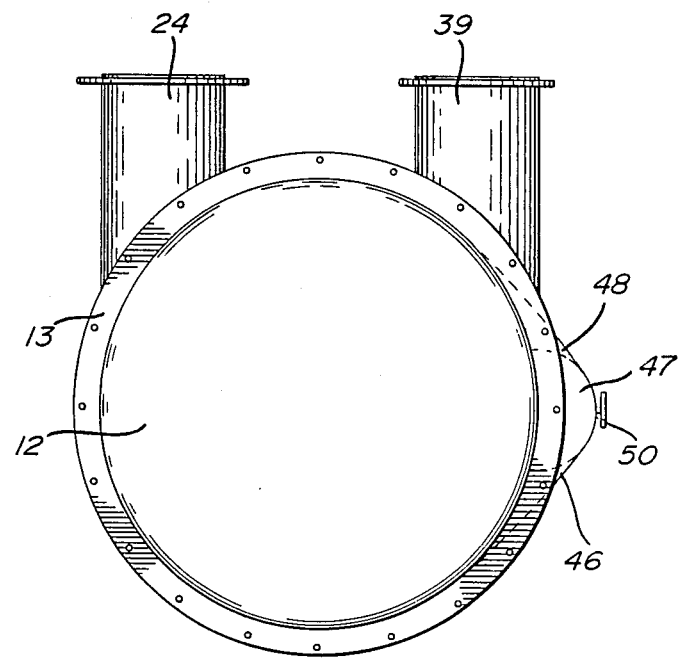
FIG. 2 is a top plan view of the screening device shown in FIG. 1.

One embodiment of a pulp screening device is shown in the drawings wherein a generally cylindrical housing 11 has a top cover 12 joined to the housing 11 at flange 13. A lower bottom flange 15 on the housing 11 provides supports for mounting the device. A reject chamber 16 is shown projecting below the bottom flange 15, thus the mountings must be raised. In the embodiment shown, the screening device is a vertical screening device with a vertical axis of rotation. However, the present invention need not be limited to utilizing a vertical screen, horizontal screens such as that shown in copending U.S. application Ser. No. 839,829 and incorporated herein by reference, may be used for both a primary and second stage screen. Thus, while the present embodiment specifically describes a vertical pressure screen, it will be clear to those skilled in the art that the invention is not limited to vertical screens, but also includes horizontal screens.

In the cylindrical housing 11 is an upper inlet chamber 18 above a disk ring 19. Below the disk ring 19 is a screening chamber 20 which has a primary screen 21 and beneath it a secondary screen 22. A tangential inlet pipe 24 supplies pulp stock to the inlet chamber 18. A conical inlet ring 25 is mounted on the disk 19 so that pulp stock entering the inlet chamber 18 rises up and then passes down through the inlet ring 25.

A rotary impeller 28 is positioned axially within the screening chamber 20 and is shaped approximately in the form of a paraboloid segment. In the embodiment shown, the nose cone 29 extends up above the disk ring 19, however, in other embodimentss it may be level or below the disk ring 19. The impeller 28 is mounted on a rotating axial shaft 30 which rotates in a bearing assembly 31.

Primary impeller blades 32 extend from a portion of the surface of the impeller 28 to within a short distance from the primary screen 21. The impeller blades 32 extend for the full length of the primary screen 21 and are equispaced about the rotary impeller 28. A first baffle 33 and a second baffle 34 are located concentric with the surface of the impeller 28. The first baffle 33 extends substantially parallel to the surface of the impeller 28 from the inlet end of the screen 21, and the second baffle 34 extends substantially parallel to the surface of the impeller 28 from the first baffle 33. Thus, pulp stock entering the primary screen is divided by the first baffle 33, and then that portion that is closest to the impeller 28 is re-divided by the second baffle 34. In the embodiment shown, the impeller blades 32 are omitted from the space between the baffles 33, 34 and the surface of the impeller 28. The baffles 33, 34 are arranged to direct the pulp stock onto different axial positions of the primary screen 21 and generally to provide a substantially constant axial velocity of the pulp stock as it flows down through the primary screen 21.

Below the second baffle 34, apertures 36 are provided in the surface of the impeller 28 and a dilution water supply 37. provides dilution water to pass through the apertures 36 diluting the pulp stock and assisting in screening the stock. The circular axial cross sectional area of the impeller increases as the pulp stock flows from the inlet to the outlet and thus the space between the impeller and the primary cylindrical screen 21 is reduced. Because a portion of the pulp stock passes through the primary screen 21, the axial velocity of the pulp stock passing down the screen remains substantially the same. The accept portion of the pulp stock passes through the primary screen 21 to a primary outlet chamber 38 and the primary accepts exit through tangential discharge outlet 39. The reject portion of the pulp stock passes from the primary screening stage to the secondary screening stage. The second screen 22 is shown having a larger diameter than the primary screen 21. The shape of the impeller 28 is inclined with two stages, the first stage having a slope at an angle to the axis greater than the slope of the second stage and both slopes being somewhat greater than the last portion of the impeller 28 in the primary screening stage. Second impeller blades 40 extend out from the impeller 28 to within a short distance of the second screen 22. The second impeller blades 40 are equi-spaced about the impeller 20 and extend for the length of the second screen 22. Screen openings in the second screen 22 are generally larger than those in the primary screen 21 so that rejects from the primary screen are given the chance to pass through the second screen 22. Because the second impeller blades 40 have a larger diameter than the primary impeller blades 32, greater centrifugal force is applied to the primary reject pulp stock and this creates a higher pulp stock pressure in the second stage outlet chamber 42. This high pressure is above the pressure of the pulp stock in the inlet chamber 18 so the accepts from the second stage can be recirculated to the primary stage. Rejects from the second stage pass down to the reject chamber 16.

An independent second stage dilution water supply 43 passes through apertures 44 in the impeller 32, thus allowing different pressures and flow of dilution water to be applied at the second stage. As shown in FIG. 1, the primary screen 21 is considerably longer than the second screen 22 and for preference, the length of the second screen 22 is in the range of 20 to 25% of the primary screen 21.

A tangential discharge outlet 46 from the second stage outlet chamber 42 passes in a duct 47 up the outside of the cylindrical housing 11 and has a tangential inlet 48 into the inlet chamber 18. Thus the accepts from the second screening stage recirculate through the duct 47 into the inlet chamber 18. Because the pressure of the second stage accepts is higher than the pulp stock in the inlet chamber, no recirculating pump is necessary. A valve 50 is shown in the duct 47 to control the amount of second stage accepts recirculated. By varying the opening of valve 50, the reject rate from the second screening stage may be varied. If the valve is open, then the second stage reject rate is lower due to most of the pulp recirculating. If the valve is substantially closed, then the reject rate becomes higher as more pulp passes to the reject chamber 16. Whereas duct 47 is shown as being a recirculating duct, it will be apparent to those skilled in the art that this duct could lead the second stage accepts to other areas as required in the process.

In one embodiment, the primary screen 21 has a length of 40 inches and the secondary screen has a length of 10 inches.

There is no reject rate control from the primary stage as the rejects from the primary stage all enter the second stage past the space between the primary impeller blades 32 and the second impeller blades 44.

Various changes may be made to the embodiments shown and described herein without departing from the scope of the present invention which is limited only by the following claims.

The embodiments of the invention in which an exclusive property or privilege is claimed are defined as follows.

1. In a rotary pulp screening device of the pressure type including:
   a cylindrical housing having a screening chamber therein,
   a primary cylindrical screen within the chamber, having an inlet end and an outlet end;
   rotary impeller mounted for rotation about a central axis within the chamber, the impeller having a body shape with a circular axial cross section whose diameter increases from the inlet end to the outlet end thus having a larger annular space between the primary screen and the impeller at the inlet end than at the outlet end;
   at least one substantially frusto-conical shaped baffle being disposed in the annular space at the inlet end, the baffle dividing flow of pulp stock entering the inlet end and directing the pulp stock at different axial locations along the length of the primary screen;

means for rotating the impeller:

primary impeller blades radiating from at least a portion of the impeller and extending to within a short distance from the primary screen, for substantially the length of the primary screen, and primary pulp stock discharge outlet from exterior of the primary screen, the improvement comprising:

a second cylindrical screen within the chamber, the second screen being co-axial and downstream of the primary screen, and having a diameter larger than the diameter of the primary screen, the second screen having larger screen openings than the screen openings in the primary screen;

the impeller extending axially in a downstream direction within the second screen and having a body shape with a circular axial cross section whose diameter increases from the outlet end of the primary screen in the downstream direction;

second impeller blades having a larger diameter than the primary impeller blades, the second impeller blades radiating from a downstream portion of the impeller for substantially the length of the second screen, to within a short distance from the second screen;

second pulp stock discharge outlet from exterior of the second screen with recirculating means for at least a portion of the flow of pulp stock from the second pulp discharge outlet to be recirculated to the primary cylindrical screen, and independent dilution water systems to the primary screen and to the second screen.

2. The rotary pulp screening device according to claim 1 wherin the recirculating means is a recirculating duct for the flow of pulp from the second pulp discharge outlet integral with the cylindrical housing.

3. The rotary pulp screening device according to claim 2 including valve means in the recirculating duct from the second pulp discharge outlet to enter the primary screen, the valve means controlling the portion of the flow of pulp stock recirculating.

4. The rotary pulp screening device acccording to claim 1 wherein pressure of the pulp stock from the second pulp discharge outlet is higher than pressure of pulp stock entering the primary screen.

5. The rotary pulp screening device according to claim 1 wherein the second screen has an axial length in the range of about 20 to 25% of the axial length of the primary screen.

* * * * *